United States Patent [19]

Uchikoshi

[11] Patent Number: 4,788,606
[45] Date of Patent: Nov. 29, 1988

[54] TAPE FEED CONTROL DEVICE

[75] Inventor: Gohji Uchikoshi, Tokyo, Japan

[73] Assignee: Nakamichi Corp., Tokyo, Japan

[21] Appl. No.: 97,814

[22] Filed: Sep. 16, 1987

[30] Foreign Application Priority Data

Sep. 25, 1986 [JP] Japan ............................ 61-147192[U]

[51] Int. Cl.$^4$ ........................ G11B 15/32; G11B 15/43
[52] U.S. Cl. ...................................... 360/73; 242/186;
242/75.51; 318/7
[58] Field of Search ......................... 360/73, 74.2, 74.3,
360/71; 242/186, 75.5, 75.51; 318/7, 6, 77

[56] References Cited

U.S. PATENT DOCUMENTS

| | | | |
|---|---|---|---|
| 3,870,934 | 3/1975 | Blood | 242/75.51 |
| 3,910,527 | 10/1975 | Buhler et al. | 242/186 |
| 3,982,160 | 9/1976 | Goldschmidt et al. | 242/186 X |
| 4,408,144 | 10/1983 | Lukes | 318/7 |
| 4,419,609 | 12/1983 | Meyer | 318/7 |
| 4,442,985 | 4/1984 | Kishi et al. | 360/73 X |
| 4,531,166 | 7/1985 | Anderson | 360/73 |
| 4,749,145 | 6/1988 | Steele | 242/186 |

Primary Examiner—John H. Wolff
Attorney, Agent, or Firm—Flynn, Thiel, Boutell & Tanis

[57] ABSTRACT

A tape feed control device is configured to detect resolutions of respective reels so as to supply respective reel motors with tension currents $i_{t1}$ and $i_{t2}$ for setting a tape tension to establish a predetermined tape tension of a tape extending between the reels, and so as to supply the reel motors with acceleration and deceleration currents $i_{s1}$ and $i_{s2}$ based on an acceleration/deceleration current ratio $\alpha$ to transport the tape. In this fashion, a desired tape speed is obtained, maintaining a constant tape tension.

3 Claims, 1 Drawing Sheet

TAPE FEED CONTROL DEVICE

FIELD OF THE INVENTION

This invention relates to a tape feed control device, and more particularly to an improved tape feed control device suitable for an apparatus using independent motors for individually driving a pair of reels for their tape take-up motions.

BACKGROUND OF THE INVENTION

One of the most simple arrangements of tape recorders is a system not using a capstan, tension arm, etc. but using two reel motors provided respectively for individuals of a pair of reels to transport a tape extending between the reels.

This type of reel driving system requires a particular technology for maintaining a constant tape speed and a constant tape tension. This is usually attained by detecting rotation amounts of respective reels, calculating diameters of the outermost turns of the tape on respective reels from the detected rotation amounts, supplying one of the reel motors with a tension producing current based on the calculation and controlling the speed of the other reel motor so as to maintain a desired tape speed.

However, such a prior art system involves a problem that the tape tension varies largely upon acceleration and deceleration of the tape feeding speed.

OBJECT OF THE INVENTION

It is therefore an object of the invention to provide a tape feed control device capable of always maintaining a constant tape tension upon acceleration and deceleration and during constant travel of the tape transport.

SUMMARY OF THE INVENTION

To attain the object, the invention provides a tape feed control device comprising:

two reel motors, a rotation detecting means for detecting rotation information signals of said reels, and a tension signal output means for effecting an operation based on said rotation information signals to fix tension currents to be applied to said reel motors respectively to establish a predetermined tension of a tape extending between said reels;

a reference speed signal output means for producing a reference speed signal which fixes the speed of transporting said tape;

a difference information output means for comparing at least one of said rotation information of said reels with said reference speed signal and outputting a resulting difference information signal;

an acceleration and deceleration signal output means responsive to said difference information signal to produce acceleration and deceleration signals which fix acceleration and deceleration currents for driving respective said reel motors; and reel motor driving means for producing motor drive currents based on said tension signals and said acceleration and deceleration signals to drive respective said reel motors.

With this arrangement, individual motors are driven based on an information signal indicating a difference between reference speed signal and rotation information signal of reel and are supplied with tension currents to give a predetermined tension to the tape extending between both reels, according to an operation based on information about revolutions of the reels.

DETAILED DESCRIPTION

The invention is described below, referring to a preferred embodiment illustrated in FIGS. 1 and 2.

Figure 1:
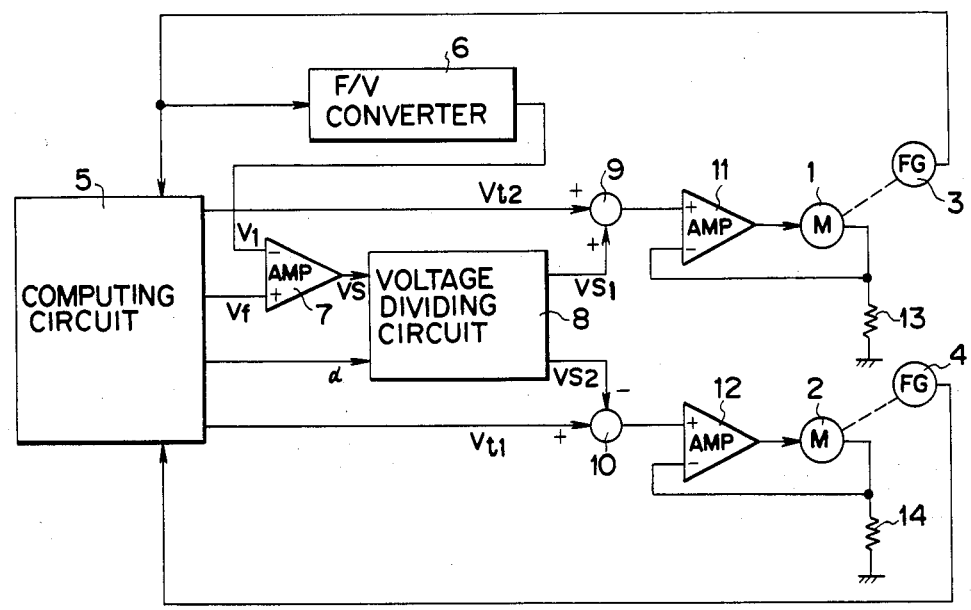
FIG. 1 is a block diagram showing an embodiment of the invention.

FIG. 1 is a block diagram showing an embodiment of the invention.

To individual drive shafts of a pair of reels are connected reel motors 1 and 2 to which frequency generators 3 and 4 for generating pulse signals responsive to revolutions of the reel motors 1 and 2 are connected individually. To the frequency generators 3 and 4 is connected an computing circuit 5 which is responsive to outputs of the frequency generators 3 and 4 to effect various operations described later. A frequency-to-voltage converter (hereinafter called F/V converter). A differential amplifier 7 produces information indicating a difference voltage between a reference speed voltage signal vf supplied from the computing circuit 5 and an output voltage signal $v_1$ supplied from the F/V converter 6. An output voltage signal $v_s$ of the differential amplifier 7 is divided into rotational drive voltage signals $v_{s1}$ and $v_{s2}$ by a voltage dividing circuit 8, using an acceleration/deceleration ratio $\alpha$ supplied from the computing circuit 5. Individual voltage signals $v_{s1}$ and $v_{s2}$ are applied to an adder 9 and a subtracter 10 respectively. The adder 9 and the subtracter 10 effect addition and subtraction between the rotational drive voltage signals $v_{s1}$ and $v_{s2}$ outputted from the voltage divider 8 and tension voltage signals $v_{t1}$ and $v_{t2}$ supplied from the computing circuit 5. An amplifier 11 is connected to the adder 9, and an amplifier 12 is connected to the subtracter 10. The reel motor 1 is connected to the amplifier 11, and a resistor 13 is connected in series with the reel motor 1 so that its terminal voltage is fed back to the (−) terminal of the amplifier 11. Similarly, the reel motor 2 is connected to the amplifier 12, and a resistor 16 is connected in series with the reel motor 2 so that its terminal voltage is fed back to the (−) terminal of the amplifier 12. Therefore, the amplifiers 11 and 12 constituting these negative feedbacks supply the reel motors 1 and 2 with reel motor drive currents proportional to output voltage signals of the adder 9 and subtracter 10.

The illustrated drive system is an example configured to transport a tape at a constant speed between a pair of reels 21 and 22, maintaining a constant tape tension. This arrangement is usually called "reel driving system", and configured to excite the reel motors in opposite directions to maintain a required tape tension.

In order to accelerate the tape speed in this condition, excitation of an upstream reel motor may be increased, or alternatively, excitation of a downstream reel motor may be decreased. When the excitation of the upstream reel motor is increased, the tape tension is increased during the acceleration, and when excitation of the downstream reel motor is decreased, the tape tension is decreased during the acceleration.

Therefore, if an appropriate increase of excitation of the upstream reel motor and an appropriate decrease of excitation of the downstream reel motor are effected simultaneously, the tape speed should be accelerated without changing the tape tension. When deceleration is required, excitation of the upstream reel motor is decreased and excitation of the downstream reel motor is increased by an appropriate ratio between them.

Deceleration of the tape speed may be effected by decreasing excitation of the upstream reel motor and increasing excitation of the downstream reel motor, based on an appropriate ratio.

Calculation of the ratio and a driving arrangement of the reel motors based on the calculated ratio are described below.

The computing circuit 5 produces, as a result of its operations, the tension voltage signals $v_{t1}$ and $v_{t2}$ determining tension currents $i_{t1}$ and $i_{t2}$ to establish a predetermined tape tension, the reference speed voltage signal $v_f$ determining the rotation speed of a reel motor to obtain a desired tape speed, and the acceleration/deceleration current ratio $\alpha$ setting the ratio between acceleration/deceleration currents supplied to respective reel motors. These calculations are explained below in detail.

Tension torques $T_{t1}$ and $T_{t2}$ of respective reel motors 1 and 2 required for a tape tension F are expressed by:

$$T_{t1} = F \cdot r_1 = (F \cdot V)/\omega_1$$

$$T_{t2} = F \cdot r_2 = (F \cdot V)/\omega_2$$

The tension torques $T_{t1}$ and $T_{t2}$ have the following relationships with the tension currents $i_{t1}$ and $i_{t2}$ of respective reel motors 1 and 2:

$$T_{t1} = k_1 \cdot i_{t1}$$

$$T_{t2} = k_2 \cdot i_{t2}$$

Figure 2:
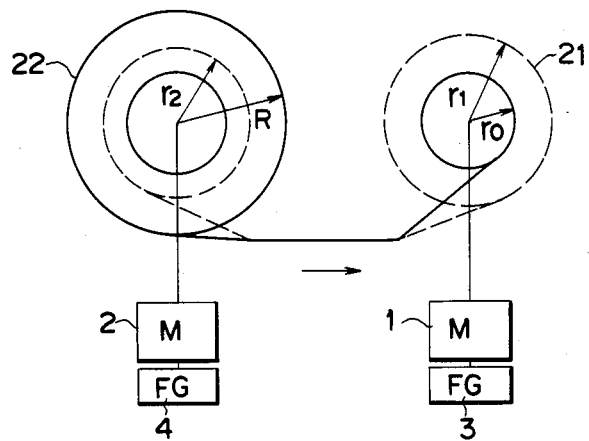
FIG. 2 is a view for explanation of the tape tension according to the invention.

Therefore, the tension currents $i_{t1}$ and $i_{t2}$ of respective reel motors 1 and 2 are expressed by:

$$i_{t1} = (F \cdot V)/(\omega_1 \cdot k_1) \qquad (1)$$

$$i_{t2} = (F \cdot V)/(\omega_2 \cdot k_2) \qquad (2)$$

where
  $r_1$ is the radius of the outermost tape turn on a reel 21 (FIG. 2);
  $r_2$ is the radius of the outermost tape turn on a reel 22 (FIG. 2);
  $\omega_1$ is the angular velocity of the reel 21;
  $\omega_2$ is the angular velocity of the reel 22;
  $k_1$ is the torque constant of the motor 1;
  $k_2$ is the torque constant of the motor 2; and
  V is the tape speed.

On the other hand, the acceleration/deceleration currents $i_{s1}$ and $i_{s2}$, torques $T_{s1}$ and $T_{s2}$ required for acceleration (disregarding the reel motor shaft loss) and angular velocities $\omega_1$ and $\omega_2$ have the following relationships:

$$T_{s1} = i_{s1} \cdot k_1 = J_1 \cdot d\omega_1/dt = J_2/r_1 \cdot dv/dt$$

$$T_{s2} = i_{s2} \cdot k_2 = J_2 \cdot d\omega_2/dt = J_2/r_2 \cdot dv/dt$$

where
  $J_1$ is the inertia moment (including the inertia of the reel motor) of the reel 21 and the tape thereon; and
  $J_2$ is the inertia moment (including the inertia of the reel motor) of the reel 22 and the tape thereon.

When $$i_{s1} + i_{s2} = i_s$$

and $$T_{s1}/T_{s2} = i_{s1}/i_{s2} = (J_1 \cdot r_2)/(J_2 \cdot r_1) = \alpha$$

where $k_1 = k_2$, the following relationships are obtained:

$$i_{s2} = i_s/(1+\alpha) \qquad (3)$$

$$i_{s1} = i_s \cdot \alpha/(1+\alpha) = i_s - i_{s2} \qquad (4)$$

The acceleration/deceleration current ratio $\alpha$ exhibits the ratio between currents fed to respective reel motors 1 and 2 to accelerate the tape speed while maintaining equal circumferential speeds of the reels 21 and 22 on which the tape is wound, having the inertia moments $J_1$ and $J_2$. Therefore, by calculating the acceleration/deceleration current ratio $\alpha$, dividing the current $i_s$ according to the calculated ratio and supplying the reel motors 1 and 2 with the acceleration/deceleration currents $i_{s1}$ and $i_{s2}$ respectively, the tape is transported without changing the fixed tape tension.

The acceleration/deceleration current ratio $\alpha$ is calculated as follows:

$$\alpha = \frac{T_{s1}}{T_{s2}} = \frac{i_{s1}}{i_{s2}} = \frac{J_1 \cdot r_2}{J_2 \cdot r_1} \qquad (5)$$

where $$J_1 = J_0 + \frac{Mt_1(r_1^2 + r_0^2)}{2} = J_0 + \frac{Mt_1 \, r_0^2(\gamma_1^2 + 1)}{2} \qquad (6)$$

$$J_1 = J_0 + \frac{Mt_1(r_2^2 + r_0^2)}{2} = J_0 + \frac{Mt_2 \, r_0^2(\gamma_2^2 + 1)}{2} \qquad (7)$$

where
  $J_0$ is the inertia moment of an empty reel;
  $Mt_1$ is the mass of the tape on the reel 21;
  $Mt_2$ is the mass of the tape on the reel 22;
  $Mt$ is the mass of the entire tape;
  R is the maximum tape radius on each reel; and
  $Jt$ is the inertia moment of the tape upon the maximum tape diameter.

Further, the following relationships are given:

$$\gamma_1 = \frac{r_1}{r_0}, \; \gamma_2 = \frac{r_2}{r_0}, \; \beta = \frac{R}{r_0}, \text{ and } Mt_1 + Mt_2 = Mt$$

Accordingly, the following relationship is obtained:

$$Jt = \frac{Mt(R^2 + r_0^2)}{2} \; \therefore \; Mt = \frac{2Jt}{R^2 + r_0^2} = \frac{2Jt}{r_0^2(\beta^2 + 1)}$$

On the other hand, since the following relationships are valid:

$$Mt_1 = Mt \frac{r_1^2 - r_0^2}{R^2 - r_0^2} = Mt \frac{\gamma_1^2 - 1}{\beta^2 - 1} = \qquad (8)$$

$$\frac{2Jt(\gamma_1^2 - 1)}{r_0^2(\beta^2 + 1)(\beta^2 - 1)}$$

-continued $$Mt_2 = Mt \frac{\gamma^2 - 1}{\beta^2 - 1} = \frac{2Jt(\gamma_2^2 - 1)}{r_0(\beta^2 + 1)(\beta^2 - 1)} \quad (9)$$

the following equation is obtained by entering equation (8) in equation (6):

$$J_1 = J_0 + Jt \frac{(\gamma_1^2 + 1)(r_1^2 - 1)}{(\beta^2 + 1)(\beta^2 - 1)} = J_0 + Jt \frac{\gamma_1^4 - 1}{\beta^4 - 1}$$

and the following result is established by entering equation (9) in equation (7):

$$J_2 = J_0 + Jt \frac{\gamma_2^4 - 1}{\beta^4 - 1}$$

$$\therefore \alpha = \frac{J_1 r_1}{J_2 r_1} = \frac{\left(J_0 + Jt \frac{\gamma_1^4 - 1}{\beta^4 - 1}\right)\gamma_2}{\left(J_0 + Jt \frac{\gamma_2^4 - 1}{\beta^4 - 1}\right)\gamma_1}$$

With this arrangement, the device operates as described below.

The computing circuit 5 operates the angular velocities $\omega_1$ and $\omega_2$ of the reel motors 1 and 2, based on outputs from the frequency generators 3 and 4, calculates from equations (1) and (2) the tension currents $i_{t1}$ and $i_{t2}$ of respective reel motors 1 and 2 according to the angular velocities $\omega_1$ and $\omega_2$ so as to give the tape a predetermined tape tension F, and supplies the adder 9 and the subtracter 10 with the tension voltage signals $v_{t1}$ and $v_{t2}$ corresponding to the tension currents $i_{t1}$ and $i_{t2}$. The amplifiers 11 and 12 receiving outputs from the adder 9 and subtracter 10 compares the tension voltage signals $v_{t1}$ and $v_{t2}$ from the adder 9 and subtracter 10 and voltages of current information following in the reel motors 1 and 2 (terminal voltages of the resistors 13 and 14), and controls so that the tension currents $i_{t1}$ and $i_{t2}$ flow respectively. Respective reel motors 1 and 2 are configured to generate torques in opposite directions to each other so as to establish the tape tension F at this time.

On the other hand, the tape speed V is controlled by a negative feedback control of the differential amplifier 7 which detects information about a difference voltage between the reference speed voltage signal $v_f$ calculated by the computing circuit 5 and the speed voltage signal $v_1$ outputted from the F/V converter 6.

Here, the reference voltage signal $v_f$ is calculated from the following equation.

For example, from the relationships:

$$t \cdot V \cdot tp = \pi(r_{12}^2 - r_{11}^2) \text{ and}$$

$$V = r_{12} \cdot \omega_1$$

the following equation is established:

$$\omega_1 = \frac{V}{\sqrt{r_{11}^2 + \frac{t \cdot V \cdot tp}{\pi}}} \quad (10)$$

where
$r_0$ is the radius of the reel hub;

$r_{11}$ is the radius of the outermost tape turn on the reel 21 at the beginning of a tape travel;

$r_{12}$ is the radius of the outermost tape turn on the reel 21 on t seconds later, and given by:

$$r_{12} = \sqrt{\frac{t \cdot V \cdot tp}{\pi} + r_{11}^2}$$

t is the time taken from the beginning of the tape travel; and tp is the thickness of the tape.

Therefore, if the tape turn radius $r_{11}$ and the time t are given to equation (10), the reel 21 can be controlled by equation (10).

For example, it may be deemed that $r_{11} = r_0$ in an operation when the tape travel starts from the beginning of the tape turn. The computing circuit 5 obtains the reference speed voltage signal $v_f$ based on the angular velocity $\omega_1$ given by equation (10), and gives it to the differential amplifier 7. The differential amplifier 7 gives the voltage divider 8 information indicating the difference voltage between the reference speed voltage signal $v_f$ and the output voltage signal $v_1$ of the F/V converter 6 as a voltage signal $v_s$. The voltage divider 8 divides the voltage signal $v_s$ into acceleration and deceleration voltage signals $v_{s1}$ and $v_{s2}$, in accordance with the acceleration/deceleration current ratio $\alpha$ outputted from the computing circuit 5, and gives them to the adder 9 and the subtracter 10 respectively.

Therefore, current $(i_{t1} + i_{s1})$ and current $(i_{t2} - i_{s2})$ flow in respective reel motors 1 and 2, and make them rotate so that the speed voltage signal $v_1$ outputted from the F/V converter 6 follow the reference speed voltage signal vf. As a result, the tape is transported in the arrow-mark direction in FIG. 2, without changing the tape tension F. The driving voltage $v_s$ changes with situations of the reel motors, i.e. at the acceleration and deceleration and during constant travel of the tape transport. However, since the voltage is always divided by the acceleration/deceleration current ratio $\alpha$, the tape tension F is always maintained at a constant value.

In the aforegoing embodiment, the acceleration/deceleration current ratio $\alpha$ is obtained by an operation. However, the acceleration/deceleration current ratio $\alpha$ does not exhibit a large change, in the following conditions:

(b 1) equalizing inertia masses of both reels;
(b 2) uniforming the capacities of both reel motors; and
(b 3) setting the maximum ratio of tape turn diameters of both reels within 1:2, and selection of a predetermined value, e.g. 1:1 (0.5) will hold changes of the tape tension within an accepted range.

Therefore, the acceleration/deceleration current ratio $\alpha$ may be fixed to a predetermined value so as to supply respective reel motors with acceleration and deceleration currents according thereto.

Beside this, the reference speed voltage signal $v_f$ is obtained by an operation in the aforegoing embodiment. However, it may be replaced by an arrangement configured to originally store the reference speed signal $v_f$ in a memory so as to take it up from the memory upon a tape travel.

As described above, the invention arrangement can always maintain a constant tape tension in all tape motions, i.e. changes of the travelling direction, start of travel, constant speed travel, and others which cause changes in the driving voltage.

What is claimed is:

1. A tape feed control device, comprising:

two reel motors, a rotation detecting means for detecting rotation information signals of said reels, and a tension signal output means for effecting an operation based on said rotation information signals to determine tension currents to be applied to said reel motors respectively to establish a predetermined tension of a tape extending between said reels;

a reference speed signal output means for producing a reference speed signal which determines the speed of transporting said tape;

a difference information output means for comparing at least one of said rotation information of said reels with said reference speed signal and outputting a resulting difference information signal;

an acceleration and deceleration signal output means responsive to said difference information signal to produce acceleration and deceleration signals which determine acceleration and deceleration currents for driving respective said reel motors; and reel motor driving means for producing motor drive currents based on said tension signals and said acceleration and deceleration signals to drive respective said reel motors.

2. A tape feed control device of claim 1 wherein said acceleration and deceleration signal output means includes: an acceleration and deceleration current ratio signal output means for effecting an operation based on said rotation information signals to produce the ratio between said acceleration and deceleration currents for driving respective said reel motors; and a signal processing means responsive to said difference information signal and said acceleration and deceleration current ratio signal to produce acceleration and deceleration signals for determining acceleration and deceleration currents for driving respective said reel motors.

3. A tape feed control device of claim 1 wherein said reference speed signal output means effects an operation to produce a signal for uniforming the tape transport speed.

* * * * *